United States Patent
Giannuzzi et al.

[11] Patent Number: 5,885,041
[45] Date of Patent: Mar. 23, 1999

[54] CHEMICAL SELF-TAPPING, SCREW-TYPE MASONRY ANCHOR

[75] Inventors: Louis N. Giannuzzi, Stamford, Conn.; Anthony C. Giannuzzi, 28 Doral Farm Rd., Stamford, Conn. 06902

[73] Assignee: Anthony C. Giannuzzi, Stamford, Conn.

[21] Appl. No.: 905,814

[22] Filed: Aug. 4, 1997

[51] Int. Cl.⁶ ........................................ F16B 39/02
[52] U.S. Cl. ........................ 411/82; 411/258; 411/412
[58] Field of Search ............................ 411/82, 258, 930, 411/411, 412

[56] References Cited

U.S. PATENT DOCUMENTS

| | | | |
|---|---|---|---|
| 410,697 | 9/1889 | Rogers | 411/412 |
| 3,207,023 | 9/1965 | Knohl | 411/412 |
| 3,897,713 | 8/1975 | Gugle | 411/82 |
| 4,280,391 | 7/1981 | Fischer | 411/82 |
| 4,527,932 | 7/1985 | Onasch | 411/411 |
| 4,544,313 | 10/1985 | Grossberndt | 411/411 |
| 5,061,136 | 10/1991 | Dixon | 411/412 |

FOREIGN PATENT DOCUMENTS

| | | | |
|---|---|---|---|
| 2910083 | 9/1980 | Germany | 411/82 |
| 2115511 | 9/1983 | United Kingdom | 411/412 |

*Primary Examiner*—Flemming Saether
*Attorney, Agent, or Firm*—Michael Ebert

[57] ABSTRACT

A self-tapping, screw-type masonry anchor turnable into a hole drilled in masonry to fasten an object thereto, the anchor also being capable of being chemically retained in the hole to render it exceptionally resistant to pull out and vibratory forces. The anchor includes a head engageable by a tool to turn the anchor into the hole and a shank extending from the head surrounded by at least one helical cutting thread whose crest diameter exceeds the hole diameter whereby as the anchor is turned into the hole, a mating thread is then tapped in its bank. Also surrounding the shank in the space between successive convolutions of the thread is a helical zone. The shank of the anchor is coated with a release agent, and when a charge of an uncured, flowable resinous adhesive is deposited in the hole and the shank is turned therein, this adhesive then fills the helical zone, the flowable adhesive acting to lubricate and cool the cutting thread as the shank is turned into the hole. When the adhesive cures and hardens, a chemical barrier is formed in the zone which is bonded to the bank of the hole but not to the shank. Thus the anchor is mechanically retained in the hole by the cutting thread and chemically retained therein by the hardened barrier, yet the anchor can be turned out of the hole to unfasten the object from the masonry.

17 Claims, 2 Drawing Sheets

CHEMICAL SELF-TAPPING, SCREW-TYPE MASONRY ANCHOR

BACKGROUND OF INVENTION

1. Field of Invention

This invention relates generally to masonry anchors, and more particularly to a self-tapping, screw-type masonry anchor which can readily be turned into a hole drilled in masonry to secure a fixture or other object thereto, the anchor also being capable of being chemically retained in the hole whereby the installed anchor which combines the holding power of a self-tapping anchor with that of a chemical anchor is exceptionally resistant to forces seeking to pull the anchor out of the hole as well as to vibratory and shock forces.

2. Status of Prior Art

It is frequently necessary to secure fixtures, brackets, channel pieces and other more or less heavy objects to the surface of a masonry structure formed of concrete, brickwork or other masonry material. These objects are fastened to the masonry structure by masonry anchors.

Concrete is made by mixing cement and an aggregate of sand or broken stone screenings with gravel. Compressive strength is generally accepted as the principal index to the structural quality of concrete. Mixtures for concrete masonry structures, such as walls and partitions, ordinarily employ aggregates having a maximum size of one-half inch. Masonry brick is usually formed from clay, shale or pumice hardened by heat. Bricks for this purpose are available in different degrees of hardness, depending on the material used in making the brick.

But regardless of the material used in forming a masonry structure, when a hole is drilled therein to receive a self-tapping metal masonry anchor whose threaded shank taps the bank of the hole, because the material is friable this tapping action may cause the masonry to crumble or pulverize. Hence the suitability of a self-tapping masonry anchor depends on the quality of the masonry.

The Ernst et al. patent 3,937,119, discloses a self-tapping, screw-type masonry anchor having a sharp-crested helical male thread surrounding the shank, the convolutions of the thread running the length of the shank. When the anchor is screwed into a hole drilled in masonry, the male thread functions to tap the bank of the hole to create an internal female thread therein. Since the male thread on the shank mates with the female thread in the bank of the hole, the anchor is then mechanically resistant to pull-out forces which seek to back the anchor out of the hole.

Also included in the Ernst et al. anchor is a second thread whose convolutions surround the shank in the zone between successive convolutions of the cutting thread. The crests of the second thread have a diameter smaller than that the crests of the cutting thread and about equal to the diameter of the masonry hole. This second thread functions as a guide thread to center the anchor in the masonry hole so that the anchor is not permitted to tilt as it is turned into the hole. By preventing such tilting, one enhances the pull-out resistance of the anchor; for if the anchor were tilted, the crests of the cutting thread would then not be properly embedded in the hole.

Other patents disclosing a screw-type anchor which includes a secondary thread in addition to a primary cutting thread are the patents to Dixon et al. 5,051,136 and 5,628,161. As in the Ernst et al. patent, the secondary thread in the Dixon et al. patents serve to guide the screw anchor and prevent it from tilting.

The Giannuzzi patent 5,282,708 discloses a self-tapping screw-type thread in which the crests of the male thread decrease progressively in diameter from the leading to the trailing end to create a reverse taper. But there is no secondary thread disclosed in this patent.

Also of prior art interest in regard to screw-type masonry anchors is the European patent application No. 91 919296.3 of Charles Bickford which discloses an anchor in which the successive convolutions of the cutting thread which has a helix angle of at least 8 degrees, are spaced apart by an intervening land having a helical zone depressed therein.

In any form of screw-type masonry anchor, one is faced with the problem that a cutting action by the male cutting thread to cut a deep female thread in the bank of the drilled masonry hole may not have the desired result despite the fact that the deeper the female thread, the greater is the holding power of the anchor. The reason this result is not always realized is that the cutting action of the male thread may so disintegrate the masonry material as to weaken the holding power of the anchor.

In order, therefore, to anchor a threaded bolt or stud in a hole drilled in masonry without disintegrating the masonry, it is common practice to use a curable chemical bonding agent or adhesive for this purpose as disclosed, for example, in the Giannuzzi patent 5,628,161 which shows a chemically-bonded stud anchor for fastening a fixture to masonry.

A typical bonding agent of this type has two flowable components, one being a resinous bonding agent, the other a hardener therefor. The resins may be phenol, vinyl, ester or epoxy based. The two components, when stored, must be separated to prevent interaction therebetween. Many bonding agents currently available have an accelerated curing time and set within 30 minutes to afford substantial holding power. In practice, a charge of the resinous component and sufficient hardener intermixed therewith are deposited in the hole, and a threaded mounting stud is then inserted in the hole.

To this end, use may be made of a dispenser gun to inject a charge of the flowable bonding agent into the drilled hole. Or the charge may be contained in a capsule that is deposited in the drilled hole and is ruptured to release the bonding agent when the stud is inserted in the hole.

After the resinous interfacial layer between the stud and the bank of the hole cures and rigidifies, it then bonds itself both to the stud and to the masonry whereby the stud is permanently anchored in the hole. In order now to secure a fixture to the masonry face, the fixture which has a mounting hole therein is placed over and onto the projecting stud and locked thereto by a washer and nut.

It is known in a chemical anchor to coat the externally-threaded cylindrical shank of the stud or bolt with a release agent, such as TEFLON (PTFE) or a similar material having non-stick properties. When the shank of the bolt is inserted in a drilled masonry hole having a deposit of an uncured adhesive therein, the release coating prevents this adhesive, when cured and hardened, from adhering to the shank.

A chemical anchor of this type is disclosed in the Kellison patent 4,642,964 and also in the Roth patent 5,590,360. In the chemical anchors disclosed in these patents, when the epoxy cures and hardens in the drilled masonry hole, a female thread is then impressed in the hardened epoxy surrounding the shank. This female thread matches the male thread of the release-coated shank; hence the bolt is then free to turn in either direction.

A serious practical drawback of a chemical masonry anchor is that it does not function as such until the bonding agent has fully cured and hardened so that the anchor is firmly retained in the masonry hole. Even with fast-acting epoxy bonding agents, it takes at least a half hour before the installation is fully secure. If therefore a chemical anchor is used to fasten a railing or a fixture to the surface of the masonry, it becomes necessary to provide some external means to maintain the railing or fixture in its proper position until the bonding agent has fully hardened. In contradistinction, with a screw-type anchor for fastening an object to masonry, once screwed into the drilled masonry hole and tightened, it attains its full holding power.

Another drawback of a chemical anchor for fastening an object to masonry is that after the bonding agent has hardened, it is usually then necessary to effect tightening of the fastening by turning in the anchor to further advance it into the hardened agent. It becomes necessary therefore as in the Kellison patent '964 to create a free space in the bonding agent below the shank of the anchor to permit the shank of the anchor to advance.

Since a hybrid masonry anchor, in accordance with the invention, acts chemically as well as mechanically to retain the anchor turned into a masonry hole, of prior art interest is the Gugle patent 3,897,713. Though this patent is not related to the field of masonry anchors, it does disclose a stud type anchor having a dual thread that is both chemically and mechanically held in a hole formed in a plastic workpiece.

In Gugle, the stud is provided with a shank having a high-crested helical cutting thread that taps its way into the hole in the workpiece and thereby mechanically anchors the stud, the shank being coated with a heat-activatable adhesive. The shank is also provided with a smaller crested thread that does not engage the bank of the hole, but acts only to increase the area of surface contact between the shank of the stud and the heat-activatable adhesive coating the shank. In order to activate this adhesive and chemically anchor the stud, heat must be applied to the workpiece to melt the coating on the shank.

When a fixture or other object is fastened to masonry by means of an anchor that goes into a drilled masonry hole through a mounting hole in the fixture that lies in registration with the drilled hole, it is useful to be able not only to fasten the object to the masonry, but also to be able to later unfasten the object. Thus if the object fastened to the masonry is a heavy duty motor, one must be able to detach the motor when it becomes necessary to replace it.

With a screw-type masonry anchor which taps a female thread in the bank of the masonry hole, it is a simple matter to unscrew the anchor to unfasten the motor. But with a chemical anchor, should one wish to be able to later remove this anchor from the masonry hole, it is essential that the bonding agent, though serving to chemically retain the shank of the anchor in the masonry hole, not be bonded to the shank, thereby permitting the bolt or stud to be unscrewed from the hardened bonding agent.

SUMMARY OF INVENTION

In view of the foregoing, the main object of this invention is to provide a self-tapping screw-type masonry anchor turnable into a hole drilled in masonry to fasten an object thereto, the anchor also being capable of being chemically retained in the hole to render it exceptionally resistant to pull-out and vibratory forces.

More specifically, an object of this invention is to provide a hybrid anchor of the above type which is mechanically retained in the drilled masonry hole by at least one cutting thread surrounding the shank of the anchor and acting to tap the bank of the hole to cut a mating thread therein, the anchor being at the same time chemically retained in the drilled hole by a hardened chemical barrier bonded to the bank of the hole but not to the shank.

Among the significant advantages of a hybrid masonry anchor in accordance with the invention are the following:

A. When the anchor is turned into a drilled masonry hole and tightened, the object to be fastened to the masonry is then firmly held in place even though the chemical bonding agent has not yet cured and hardened. Consequently no need exists as with a conventional chemical anchor, to provide external means to hold in place the fixture or other object to be fastened to the masonry as the resinous bonding agent proceeds to cure and harden.

B. Nor does a need exist, as with a conventional chemical anchor, to tighten the anchor after the bonding agent has hardened, for the hybrid anchor is in a tightened state well before the agent hardens.

C. The uncured bonding agent which is flowable, acts to lubricate and cool the cutting thread as the shank of the anchor cuts a mating thread in the bank of the drilled masonry hole, thereby making it easier to turn the anchor into the hole and minimizing disintegration of the masonry by the cutting thread.

D. Because the shank of the anchor is coated with a release agent, when the bonding agent hardens in the drilled masonry hole, it is then securely bonded to the bank of this hole but not to the shank; hence the anchor is free to be turned out of the hole to unfasten the object.

E. The combined effect of chemical and mechanical retention renders the hybrid anchor effectively vibration proof, and the anchor will not loosen even when subjected to heavy vibratory forces.

F. The holding power of the anchor integrates the power of its self-tapping anchoring component with that of its chemical anchoring component, thereby rendering the anchor exceptionally resistant to pull-out forces.

G. The hybrid anchor is also useable as a straight forward self-tapping screw type anchor.

Briefly stated, these objects are attained by a self-tapping, screw-type masonry anchor turnable into a hole drilled in masonry to fasten an object thereto, the anchor also being capable of being chemically retained in the hole to render it exceptionally resistant to pull out and vibratory forces. The anchor includes a head engageable by a tool to turn the anchor into the hole and a shank extending from the head surrounded by at least one helical cutting thread whose crest diameter exceeds the hole diameter whereby as the anchor is turned into the hole, a mating thread is then tapped in its bank. Also surrounding the shank in the space between successive convolutions of the thread is a helical zone.

The shank of the anchor is coated with a release agent, and when a charge of an uncured flowable resinous adhesive is deposited in the hole and the shank is turned therein, this adhesive then fills the helical zone, the flowable adhesive acting to lubricate and cool the cutting thread as the shank is turned into the hole. When the adhesive cures and hardens, a chemical barrier is formed in the zone which is bonded to the bank of the hole, but not to the shank. Thus the anchor is mechanically retained in the hole by the cutting thread and chemically retained therein by the hardened barrier, yet the anchor can be turned out of the hole to unfasten the object from the masonry.

BRIEF DESCRIPTION OF DRAWING

For a better understanding of the invention as well as other objects and further features thereof, reference is made to the following detailed description to be read in conjunction with the accompanying drawing, wherein.

DETAILED DESCRIPTION OF INVENTION

Hybrid Anchor (First Embodiment)

Figure 1:
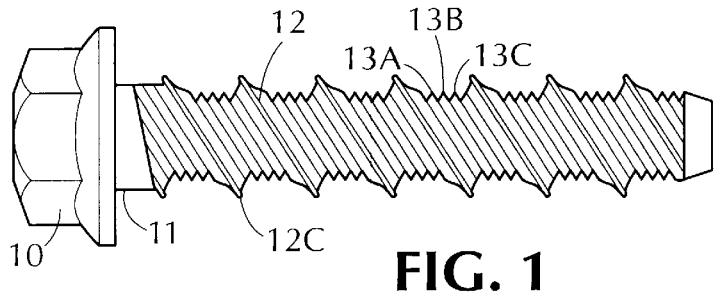
FIG. 1 illustrates a first embodiment of hybrid masonry anchor bolt in accordance with the invention.

In the embodiment shown in FIG. 1 of a chemical self-tapping screw-type masonry anchor in accordance with the invention, the anchor is mechanically retained in a hole drilled in masonry by a primary cutting thread which acts to tap the bank of the hole to cut a mating thread therein. The anchor is at the same time chemically retained in the hole by at least one secondary thread which impresses a matching thread in a hardened chemical bonding agent bonded to the bank of the drilled hole.

This hybrid anchor serves to fasten a fixture or other object to the masonry when it is screwed into the drilled hole. And the anchor therefore must be capable of being unscrewed from the hole in order to unfasten the object.

For the anchor to operate in this manner it must possess the basic characteristics of a machine screw.

A screw thread is a continuous helical rib formed on a cylindrical shank. The pitch of the thread is the distance between the crests of adjacent convolutions. The helix angle of a thread is the angle formed by the helix at the pitch diameter line and a line at right angles to the axis. Hence the greater the helix angle, the greater is the pitch of the screw and the broader the zone between successive convolutions. Thus should the helix angle be increased sufficiently, a second helical thread can be formed in the zone between the convolutions of the first thread.

The lead of a screw is the distance it advances parallel to the axis when the screw is turned one revolution. Hence for a single thread screw, the lead of the screw is equal to its pitch. When a rapid advance is desired, as in valves, then double, triple or even quadruple threads are used.

Figure 2:
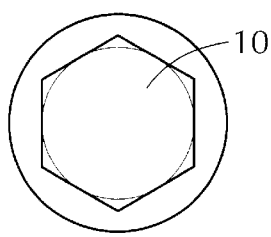
FIG. 2 a plan view of the head of the anchor.
Figure 3:
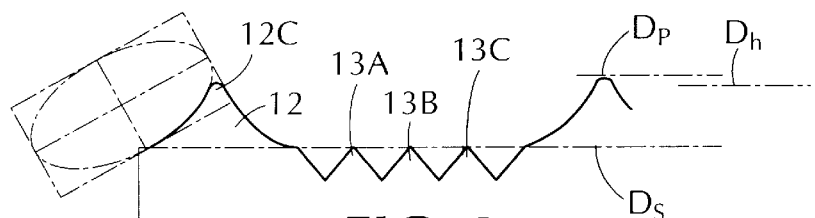
FIG. 3 is an enlarged view of the threading on the shank of the anchor.

Referring now to FIGS. 1 to 3, there is shown a hybrid masonry anchor bolt in accordance with the invention which is screwable into a hole of predetermined diameter drilled in masonry to fasten a fixture or other object to the exposed masonry surface. The same anchor is capable of being chemically held in the hole to render it exceptionally resistant to pull-out forces which seek to withdraw the anchor from the hole as well as to vibratory forces which seek to loosen the anchor.

The anchor bolt is fabricated of a metal, such as carbon steel, stainless steel or similar high strength material, resistant to corrosion resulting from contact with moisture and chemicals found in masonry structures. To enhance corrosion-resistance, a corrosion resistant finish may be provided, such as a galvanized metal coating. The anchor may be formed by machining a metal stock piece, or by cold rolling through a die shaped to define the helical threads. The metal stock for this purpose must be plastically deformable.

The bolt includes an enlarged standard hexagonal flange screw head 10 that is engageable by a torque tool to turn the anchor into the drilled masonry hole. The tool may be a hand wrench or a power-operated tool. Extending from head 10 is a cylindrical shank 11 surrounded by a primary male cutting thread 12 whose sharp crests 12C have a diameter Dp somewhat greater than the predetermined diameter $D_h$ of the drilled masonry hole. Hence when the anchor is turned into the drilled masonry hole, the primary male cutting thread taps a mating female thread in the bank of the hole.

The helix angle of primary thread 12 creates a broad zone between successive convolutions of this thread. Within this broad zone which runs in a helical path the length of the shank is a triple secondary thread formed by three like helical threads 13A, 13B and 13C which surround the shank. The triple secondary thread has a crest diameter $D_s$ substantially smaller than the diameter $D_h$ of the masonry hole, as shown in FIG. 3. The helix angle of each of the three like threads which constitute the secondary thread is identical to that of primary thread 12; hence the primary and secondary threads have the same pitch and lead, and differ only in their crest diameter. In practice, a single secondary thread may be used, or a double secondary thread.

In order to render the primary thread 12 capable of cutting hard masonry resistant to a tapping action, the profile of this thread, as shown in FIG. 3, is such as to define a pair of opposing curvilinear flanks rising from a root and converging toward a crest having a small included angle adapted to penetrate the masonry, the sharp crest being supported on a relatively broad base. As indicated in FIG. 3 the curvature of the flanks of the primary thread may conform to that of a geometric ellipse as shown, or have other suitable shapes to facilitate cutting of the masonry material.

Anchor Bolt Installation

Figure 4:
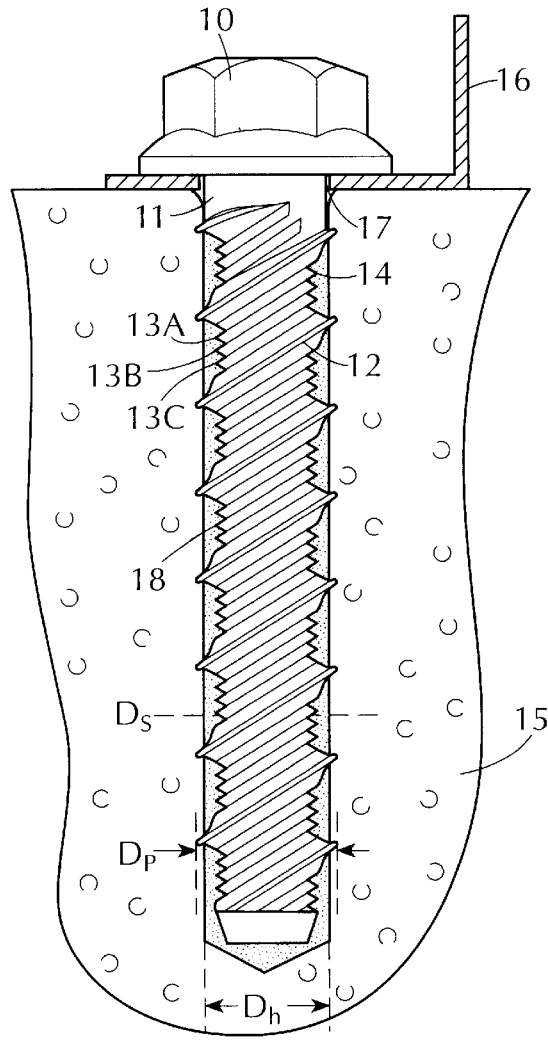
FIG. 4 shows the anchor bolt installed in a hole drilled in masonry to attach a fixture thereto.

Referring now to FIG. 4, illustrated therein is the anchor bolt shown in FIG. 1 as installed in a hole 14 drilled in a concrete or other masonry body 15, the bolt serving to fasten a fixture 16 or other object to the surface of the masonry. Fixture 16 is provided with a mounting hole 17 which registers with the drilled hole 15 so that shank 11 of the anchor bolt is insertable through the fixture mounting hole into the masonry hole.

Because primary thread 12 on the shank of the anchor bolt has a crest diameter $D_p$ somewhat greater than the diameter $D_h$ of the drilled masonry hole, when the shank is turned into the masonry hole the primary thread 12 then cuts a mating female thread in the bank of this hole. The bolt is turned zone between by a torque-producing tool until head 10 of the bolt presses against the fixture to tighten its fastening to the masonry surface.

Because the crest diameter $D_s$ of the triple secondary thread 13A, 13B and 13C is substantially smaller than diameter $D_h$ of the drilled masonry hole, free spaces are created between the bank of the hole and the triple thread in the successive convolutions of the primary thread which engage the bank of the hole.

Before the anchor is turned into the masonry hole, a charge of an uncured flowable bonding agent is deposited in the hole. This agent may be an epoxy resin and a hardener therefor. The volume of the charge of uncured and flowable bonding agent is such that when shank 11 of the bolt is turned into the masonry hole, the flowable agent then rises to fill the free spaces between the bank of the hole and the triple secondary thread. As a consequence, the flowable agent acts to lubricate and cool the helical cutting thread 12 as it taps the bank of the masonry hole, thereby making it easier to turn the anchor into the hole and minimizing disintegration of the masonry as it is cut by the cutting thread. This feature is of particular value in very hard and dense masonry which is normally very difficult to tap with a cutting thread. When the flowable agent cures and hardens, a rigid bonding agent 18 is then produced, creating a hardened barrier serving as a chemical anchor.

Shank 11 of the anchor bolt is coated with a release agent such as a thin film of TEFLON (PTFE) or other material having non-stick properties, such as paraffin. When therefore the bonding agent is hardened, it is then bonded to the bank of the masonry hole but not to shank 11. Molded in the bonding agent is a female thread matching the triple secondary thread 13A, 13B and 13C on the shank of the bolt.

It is important to note that the first step in the procedure to install the anchor is to deposit a charge of a flowable uncured bonding agent in the masonry hole. The shank of the bolt is then inserted through the mounting hole in the fixture lying on the surface of the masonry into the masonry hole, the shank then being turned until the fixture is fastened to this surface, being careful to fully tighten the fastening.

Hence the fixture is firmly held in place while the bonding agent undergoes the process of curing, yet there is no need for external expedients to maintain the fixture position during this process. When the bonding agent is fully cured and rigidified, then in addition to the mechanical anchorage afforded by the primary thread engaging the bank of the masonry hole, there is the chemical anchorage afforded by the secondary thread engaging the bonding agent barrier. In most masonry materials, the combined effect of these anchorages produce a holding power or a resistance to pull out approximating the sum of the mechanical anchorage plus the chemical anchorage.

Because the primary and secondary threads have the same helix angle, the primary thread being turnable in the female thread tapped in the bank of the masonry hole, and the secondary thread being turnable in the female thread molded in the bonding agent barrier, the anchor bolt can be turned out of the hole to unfasten the fixture.

The combined effect of mechanical and chemical anchorage are such as to greatly increase the surface contact between the shank and the masonry hole and thereby markedly restrict the freedom of the anchor to be displaced axially and laterally in the masonry hole. This renders the installation highly resistant to vibratory and shock forces which seek to shake the anchor out of the masonry hole.

Hybrid Anchor (Second Embodiment)

A common alternative to the use of a masonry anchor bolt having an enlarged head is a masonry anchor stud whose head section has a diameter no greater than its shank and is threaded to accommodate a nut.

Figure 5:
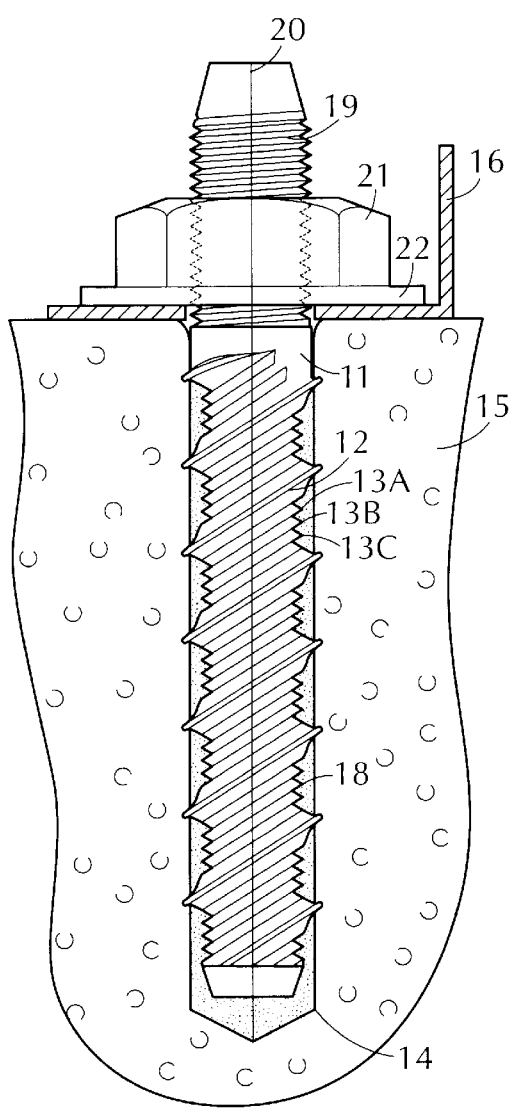
FIG. 5 shows a second embodiment of a hybrid masonry anchor in the form of a stud installed in the drilled masonry hole.

Thus as shown in FIG. 5 a hybrid anchor of the stud type has the same shank 11 and primary and secondary threads as in FIG. 1. However its externally-threaded head section 19 terminates in a shaped end 20 which is engageable by a torque tool. To fasten fixture 16 to the surface of masonry 15, a nut 21 is provided which engages threaded head section 19 of the anchor and presses a washer 22 against the surface of fixture 16 to tighten the fastening.

The operation of the stud-type anchor and the manner in which it is installed is otherwise the same as that of the bolt type masonry anchor shown in FIG. 4. In either type the volume of uncured bonding agent deposited in the drilled hole must be such as not to exceed the amount necessary to fill the free spaces when the anchor is turned into the hole.

The invention is not limited to stud or bolt type masonry anchors, for the hybrid anchor instead of having a head could have at its upper end an eye bolt or a hook, as long as whatever is used is turnable by a torque tool.

Hybrid Anchor (Third Embodiment)

In the first and second embodiments of the hybrid masonry anchor, the primary male cutting thread surrounding the shank functions to cut a mating female thread in the bank of the drilled masonry hole to effect mechanical anchorage of the anchor, whereas the secondary threads surrounding the shank in the space between the successive convolutions of the primary thread act to mold mating female threads in the solidified epoxy filling this space to effect chemical anchorage. Essential to the hybrid anchor is a release coating on the shank so that when the epoxy or other bonding agent solidifies, one can, if necessary, turn the anchor out to unfasten the object from the masonry.

Figure 6:
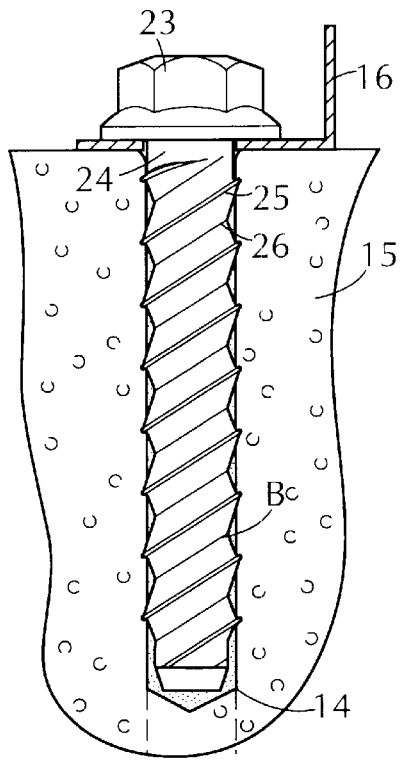
FIG. 6 illustrates a third embodiment of a hybrid masonry anchor in accordance with the invention in the form of a bolt whose shank is surrounded by a helical cutting thread and by a helical zone in the space between successive convolutions of the thread, the zone defining a triangular trough.
Figure 7:
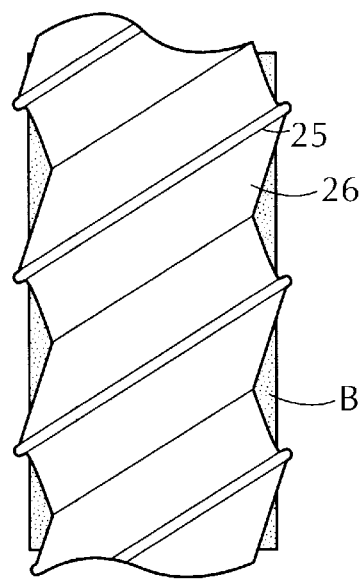
FIG. 7 is an enlarged portion of the anchor shown in FIG. 6.

In the third embodiment of a hybrid anchor shown in FIGS. 6 and 7, the anchor bolt which has an enlarged head 23 engageable by a torque tool is provided with a shank 24 that is surrounded by a helical cutting male thread 25 whose crest diameter is greater than the diameter of the hole 14 drilled in the masonry body 15. Hence when this anchor is turned into the hole, the male thread cuts a mating female thread in the bank of the hole to effect mechanical anchorage. In practice, more than one helical cutting thread may be provided, but in that event the multiple cutting threads must all have the same helix angle.

Also surrounding shank of 24 in the space between successive convolutions of male cutting thread 25 is a helical zone 26 whose geometry in this embodiment defines a trough having a triangular cross section. The shank of this hybrid anchor, as in the other embodiments, is thinly coated with a suit release agent.

When therefore there is a deposit of an uncured bonding agent in the drilled masonry hole and the shank of the anchor is screwed into the hole, the uncured bonding agent then fills helical zone 26 and acts to lubricate and cool the cutting thread. And when the agent hardens, it then forms a chemical barrier B whose geometry conforms to that of the triangular trough. Barrier B is bonded to the bank of the masonry hole but not to the shank of the anchor.

Barrier B is highly resistant to axial forces which seek to pull the anchor out of the drilled hole, for the barrier blocks axial displacement of the anchor. However, barrier B which fills the helical zone and has the same form functions as a male helical thread bonded only to the bank of the drilled hole, and permits the anchor whose helical zone 26 functions as a female thread to be turned out of the masonry hole in order to unfasten the object fastened to the masonry by the anchor.

Thus the hybrid anchor illustrated in FIGS. 6 and 7 is mechanically retained in the hole by its cutting thread, and chemically retained therein by the hardened chemical barrier, yet the anchor can be turned out of the hole to unfasten the object from the masonry.

A major advantage of the hybrid anchor is that when an object to be fastened to masonry is placed at its desired position on the masonry surface, when the anchor is turned into the masonry hole the object is then firmly held in place even though the chemical bonding agent has not yet hardened. As a consequence, it becomes unnecessary as with conventional chemical anchors to provide means to hold the fixture or other object in place until such time as the bonding agent is fully cured and solidified.

It is to be noted, however, that the hybrid anchor shown in FIGS. 6 and 7 is also usable as a conventional self-tapping masonry anchor, in which case a bonding agent is not deposited in the drilled masonry hole before the anchor is screwed into the hole.

Hybrid Anchor (Fourth Embodiment)

Figure 8:
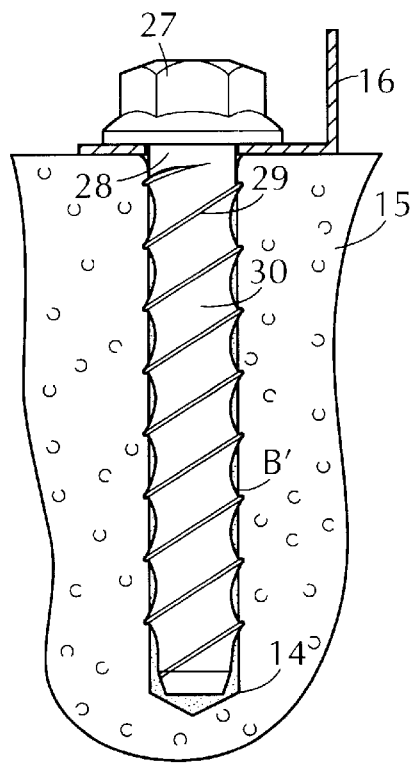
FIG. 8 illustrates a fourth embodiment which is the same as the third embodiment except that the zone defines a trough having an arcuate crossection.

The hybrid masonry anchor shown in FIG. 8 has a bolt head 27, a shank 28 extending from the head and a helical male cutting thread 29 surrounding the shank to provide mechanical anchorage when the bolt is turned into a drilled masonry hole whose diameter is somewhat smaller than the crest diameter of the thread.

However, instead of a helical zone surrounding the shank between successive convolutions of the thread whose geometry defines a triangular trough, as in the embodiment shown in FIG. 6, in the anchor shown in FIG. 8 the geometry of the zone 30 is such as to define a concave trough having an arcuate cross-section.

Hence when the epoxy or other bonding agents filling the zone hardens, the resultant chemical barrier $B^1$ which is bonded to the bank of the masonry hole but not to the release-coated shank, has a geometry conforming to that of zone 30 to create a helical male thread bonded only to the bank of the masonry hole that is turnable in the mating female thread defined by zone 30.

Hybrid Anchor (Fifth Embodiment)

Figure 9:
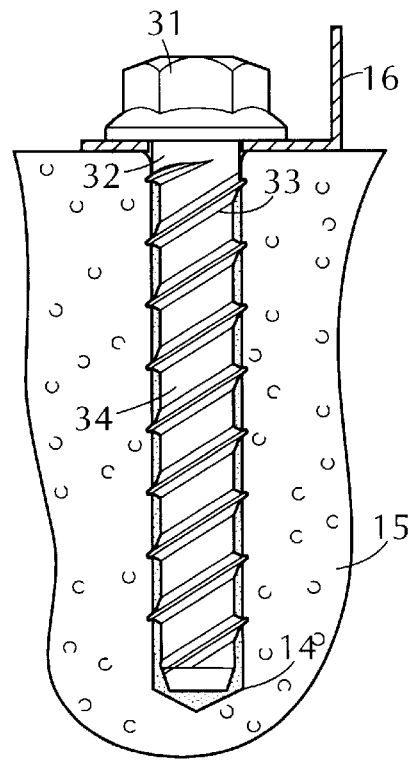
FIG. 9 illustrates a fifth embodiment which is the same as the third embodiment except that the zone defines a trough having a trapezoidal cross section.

In the embodiment shown in FIG. 9, the hybrid anchor which includes a head 31, a shank 32 extending therefrom and a helical cutting thread 33 surrounding the shank, also surrounding the shank in the space between successive convolutions of the thread is a helical zone 34 whose geometry is such as to define a trough having a trapezoidal cross section.

As a consequence, the barrier $B^{11}$, formed when the bonding agent filling the groove solidifies, has a corresponding trapezoidal form. The operation of this hybrid anchor is essentially the same as the embodiments shown in FIGS. 6 and 8.

While there has been shown preferred embodiments of a self-tapping screw-type anchor assembly in accordance with the invention, it will be appreciated that many changes may be made thereon without departing from the spirit of the invention.

We claim:

1. In combination with masonry having a hole of predetermined diameter drilled therein in which is deposited a charge of an uncured bonding agent in a flowable state that is curable at ambient temperature, a self-tapping screw-type masonry anchor turnable into said hole to fasten an object thereto, said anchor comprising:

A. an upper section engageable by a tool to turn the anchor; and

B. a shank extending from the upper section surrounded by at least one thread having a crest diameter greater than the diameter of the hole whereby when the shank is turned into the hole containing said deposit of an uncured bonding agent, a mating thread is then tapped into the bank of the hole which acts to mechanically retain the anchor in the hole and thereby fasten said object to the masonry before the agent has cured and solidified; said shank also being surrounded in a space between successive convolutions of the thread with a chemical zone whereby when the anchor is turned to screw the shank into the hole, the uncured, flowable agent deposited therein then fills the chemical zone, and when the agent is cured and solidified, it chemically retains the anchor in the hole by forming a hardened barrier that is bonded to the bank of the hole to resist axial forces which seek to pull the anchor out of the hole whereby the anchor is then a hybrid that is both mechanically and chemically retained in the hole.

2. An anchor as set forth in claim 1, in which the shank is coated with a release agent whereby the hardened barrier is not bonded to the shank and permits the anchor to be turned out of the hole to unfasten the object.

3. An anchor as set forth in claim 1, in which said zone defines a trough having a triangular cross-section.

4. An anchor as set forth in claim 1, in which said zone defines a concave trough having an arcuate cross-section.

5. An anchor as set forth in claim 1, in which said zone defines a trough having a trapezoidal cross section.

6. An anchor as set forth in claim 1, in which formed in the zone is at least one secondary thread having a helix angle which is the same as that of the cutting thread, said secondary thread having a crest diameter smaller than the hole diameter whereby when the bonding agent solidifies in the zone, molded therein is an internal thread that mates with the secondary thread.

7. An anchor as set forth in claim 6, in which formed in the zone is a triple secondary thread constituted by three like threads each having the same helix angle as the cutting thread.

8. An anchor as set forth in claim 1, in which the anchor is fabricated of a corrosion-resistant metal.

9. An anchor as set forth in claim 1, in which the upper section is a bolt head.

10. An anchor as set forth in claim 1, in which the upper section is a stud end.

11. A method for installing in a masonry hole of predetermined diameter an anchor having a shank surrounded by a cutting thread whose crest diameter exceeds that of the hole, and also surrounded between successive convolutions of the thread with a zone, said method comprising the steps of A. depositing in the hole a charge of an uncured flowable resinous bonding agent;

B. turning in the anchor to cause the thread to tap the bank of the hole and thereby mechanically secure the anchor in the hole, and to at the same time cause the uncured bonding agent to fill the zone and lubricate and cool the thread as it taps the bank of the hole; and C. permitting the bonding agent to cure and solidify to form a barrier in the zone which is bonded to the bank of the hole whereby the barrier resists axial displacement of the anchor.

12. A method as set forth in claim 11, in which the shank is coated with a release agent whereby the barrier is not bonded to the shank and the anchor can be turned out of the hole.

13. A method as set forth in claim 11, in which the bonding agent is an epoxy.

14. A method as set forth in claim 12, in which the release agent is PTFE.

15. A method as set forth in claim 11, in which the zone defines a trough having a triangular cross-section and the barrier has a like configuration.

16. A method as set forth in claim 11, in which the zone defines a concave trough.

17. In combination with masonry having a hole of predetermined diameter drilled therein in which is deposited a charge of an uncured bonding agent in a flowable state that is curable at ambient temperature, a screw-type masonry anchor turnable into said hole to fasten an object thereto, said anchor comprising:

A. an upper section engageable by a tool to turn the anchor; and

B. a shank extending from the upper section surrounded by at least one thread having a crest at least a portion of which has a diameter that exceeds the diameter of the hole whereby when the shank is turned into the hole containing said deposit of an uncured bonding agent, the crest of the thread then engages the bank of the hole to mechanically retain the anchor in the hole and thereby fasten said object to the masonry before the agent has cured and solidified; said shank also being surrounded in a space between successive convolutions of the thread with a chemical zone whereby when the anchor is turned to screw the shank into the hole, the uncured flowable agent deposited therein then fills the chemical zone, and when the agent is cured and solidified it chemically retains the anchor in the hole by forming a hardened barrier that is bonded to the bank of the hole to resist axial forces which seek to pull the anchor out of the hole whereby the anchor is then a hybrid that is both mechanically and chemically retained in the hole.

* * * * *